Jan. 15, 1935.  E. J. HOUDRY  1,987,904
TEMPERATURE CONTROL OF CONTACT MASSES
Filed May 14, 1932  2 Sheets-Sheet 1
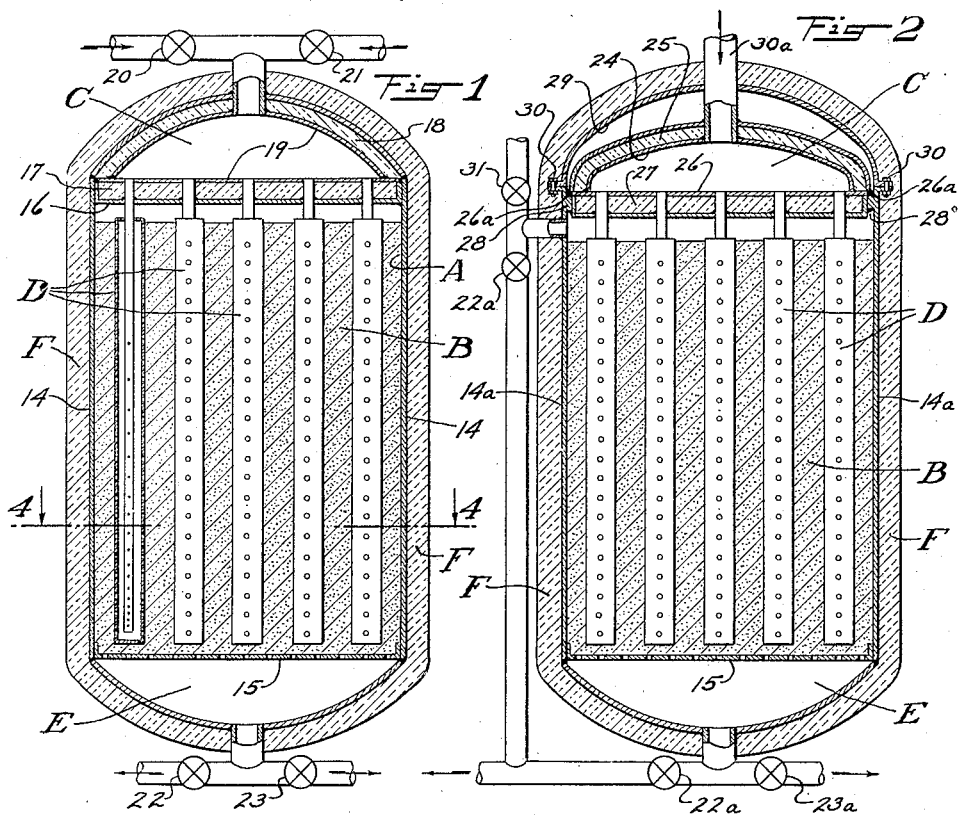
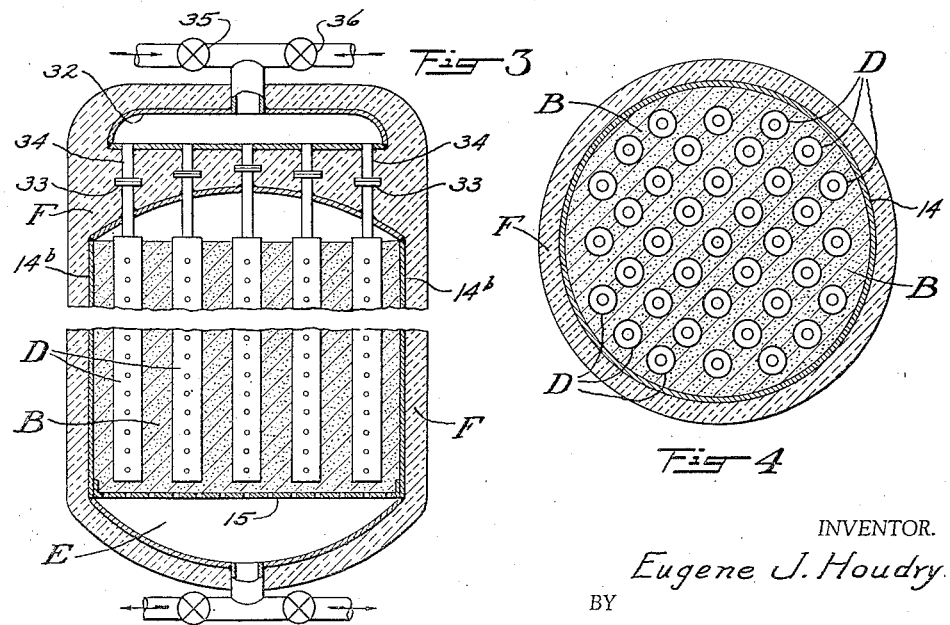
INVENTOR.
Eugene J. Houdry
BY
Ira L. Nickerson
ATTORNEY.

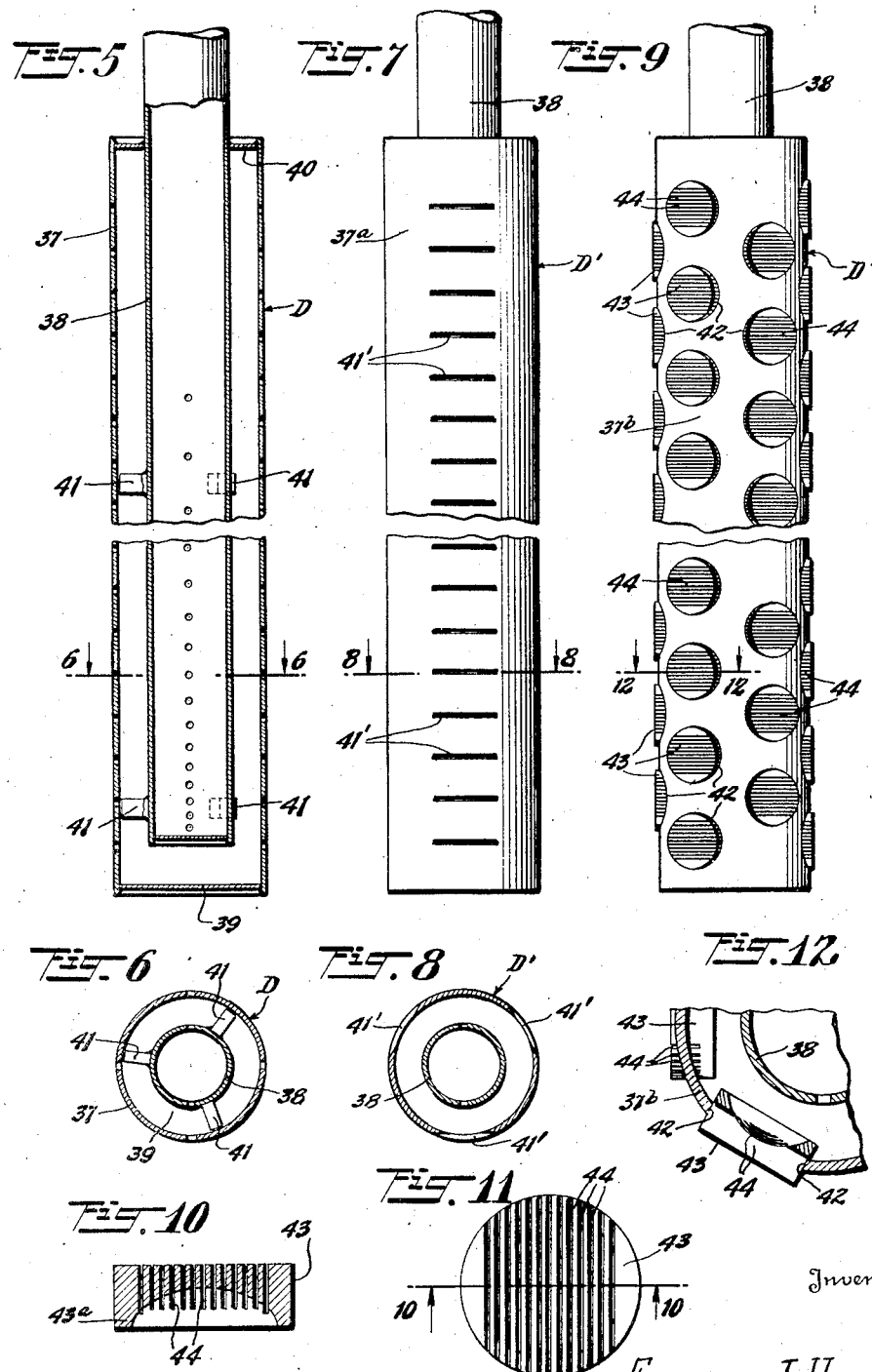

Patented Jan. 15, 1935

1,987,904

UNITED STATES PATENT OFFICE 1,987,904

TEMPERATURE CONTROL OF CONTACT MASSES

Eugene J. Houdry, Paris, France, assignor to Houdry Process Corporation, Dover, Del., a corporation of Delaware Application May 14, 1932, Serial No. 611,363

32 Claims. (Cl. 23—288)

This invention relates to the operation and control of reactions resulting from or involving the use of contact masses. More particularly it involves reactions in which control of temperature is an essential factor and during which a medium is or may be supplied to the contact mass, whether or not the medium actually takes part in or supports the reaction.

One object of the invention is to admit into a contact mass a fluid to serve as a temperature modifying and/or reacting medium at a temperature either above or below that of the reaction. Another object is to secure uniform distribution of the medium throughout the mass at a predetermined temperature. Another object is to prevent heat exchange between the contact mass and the medium before the latter reaches the chamber containing the contact mass. Other objects will be apparent from the detailed description which follows:

The invention involves the distribution at uniform temperature and pressure of a fluid medium throughout a contact mass. The medium may be merely for temperature control purposes or may actually take part in or promote the desired reaction, but in either case it is highly important that no part of the contact mass shall fall below the temperature of reaction. Hence heat exchange between the contact mass and the cooling medium is restricted, so far as possible, within the confines of the chamber in which the contact mass is actually located.

Many uses of the invention will immediately occur to any person skilled in the use of catalytic and other contact masses, as, for example, in the synthesis of ammonia, sulphuric anhydride, etc., and in the transformation of hydrocarbons. For example, in the modifying and refining of petroleum by the use of catalysts or other contact masses, the latter, after a period of operation, become contaminated or "poisoned" by an accumulation of carbon, sulphur, pitch and other gummy material. The contact mass must then be restored to active condition, or "regenerated", in this instance preferably by oxidation. In burning away the contaminating matter, heat is produced, and this must be controlled in order that the catalyst or contact mass be not overheated and destroyed, as by fusing or melting. On the other hand, it is desirable to supply the regenerating medium at a lower temperature than that required for the regenerating reaction, in order that the medium may act as a cooling agent and carry away a predetermined amount of calories, but it is essential that the medium, on reaching the contact mass, shall not cool the latter below the reaction temperature.

In order to illustrate the invention, concrete embodiments thereof are shown in the accompanying drawings, in which:

Fig. 1 is a vertical sectional view through one form of apparatus;

Fig. 2 is a vertical sectional view similar to Fig. 1 through a modified form of apparatus;

Fig. 3 is a vertical sectional view through still another modification;

Fig. 4 is a transverse sectional view as on the line 4—4 of Fig. 1;

Fig. 5 is a detail view on an enlarged scale of one of the distributing members or units, the outer element of which is shown in vertical section and the inner largely in section but partly in elevation;

Fig. 6 is a transverse sectional view on the line 6—6 of Fig. 5;

Fig. 7 is an elevational view of one of the distributing units, showing a different manner of porting of the outer conduit;

Fig. 8 is a transverse sectional view on the line 8—8 of Fig. 7;

Fig. 9 is an elevational view of a further modification of the distributing unit;

Fig. 10 is an enlarged vertical sectional view through one of the plugs shown in Fig. 9, as on the line 10—10 of Fig. 11;

Fig. 11 is a front-face elevational view of the plug shown in Fig. 10; and

Fig. 12 is a detail sectional view on a large scale on the line 12—12 of Fig. 9.

The forms of apparatus disclosed in Figs. 1, 2 and 3 are similar in that each provides a large chamber A, within which is disposed the contact mass B, and a much smaller chamber C, which serves as a reservoir or header for fluid which is to be brought into contact with mass B by a series of distributing members or units D connecting with header C but extending into chamber A so as to be embedded in contact mass B. Distributing members D are of the double conduit type disclosed in my copending application Serial No. 569,530, filed October 17, 1931, but of an improved form as will appear later. The outer conduits of units D have openings throughout the length thereof, so that fluid passing from chamber C into chamber A is distributed in a uniform manner throughout the contact mass B as will be clear from the arrangement of the distributing units indicated in Fig. 4.

In practice it has been found during reactions, either endothermic or exothermic, and during protracted regenerating or reactivating periods for removal of contaminants taken up by a contact mass such as B during an operative run, that a portion of the mass, especially that adjacent the top of a chamber such as A, tends to get out of temperature equilibrium with the remainder of the mass. This is particularly noticeable when the fluid admitted through distributing units such as D enters at a temperature below or above that of either the operative reaction or of the regenerative reaction, with the result that there is a delay in bringing the mass back to the temperature necessary for the succeeding reaction or that certain portions of the mass are not completely freed of contaminants because the temperature is brought too low for the regenerating reaction. I have discovered that these defects may be diminished or entirely overcome by an improved form of distributing unit and by restricting heat exchange between chamber A and chamber C, so that no heat is received by the entering fluid while in reservoir C or until it actually enters chamber A as by the distributing units D. Various arrangements for limiting this heat transfer are shown in Figs. 1, 2 and 3, and will now be described in detail.

In Fig. 1 the apparatus comprises a hollow casing or box 14, completely enclosed by a thick layer of insulating material F in accordance with the usual practice, and having on its interior a perforated plate or grid 15 near its lower end serving as a support for contact mass B, and defining an outlet chamber E. A depressed or dished partition plate 16 forms the top of chamber A, and has openings through which the inner conduits of units D extend to connect with reservoir C, which in this instance is a part of case 14 and conforms in general to outlet chamber E at the bottom of the case.

Partition 16 carries a thick layer of heat insulating material 17 on its upper face, and the remaining walls of chamber C are also covered on their inner sides with a thick layer of insulating material 18. A lining 19 of suitable material, such as sheet metal, may be provided to protect insulation 17 and 18 from moisture or from any action which will impair its efficiency from contact with the fluids admitted to chamber C. The upper ends of the inner conduits of units D may be suitably secured in a fluid-tight manner both to partition 16 and to lining 19 as by welding. Valved inlet connections 20 and 21 opening into reservoir C are provided both for the material to be transformed and for the regenerating medium, so that both may be uniformly distributed throughout the contact mass B by distributing units D, but heat transfer between the entering fluid and the mass will be prevented until the fluid actually enters the distributing units. The outlet pipe extending from outlet chamber E is provided with valved connections 22 and 23 for the product and for the fumes of regeneration respectively.

In Fig. 2 the reservoir chamber or header C is formed by an independent casing or box 24 having a layer of insulating material 25 on its exterior and with a heavy base plate 26, also with a thick layer of insulating material 27 on its outer or lower face. The inner conduits of distributing units D extend through insulating layer 27 and have threaded connection with openings in plate 26. The latter has a flanged portion 26a extending beyond the insulating material and adapted to rest on a shelf or flange 28 on the interior of apparatus casing 14a. The top of casing 14a is in the form of a detachable cover 29, which is applied and secured in place as by bolts or other securing members 30, after distributing casing 24 has been mounted within casing 14a. In this apparatus the single connection 30a to chamber C is for the regenerating medium only. The feed inlet at 31 opens into the top of chamber A. The outlet for the product is at 23a, but there may be two outlets for the fumes of regeneration, namely at 22a and at 22aa at the bottom and at the top respectively of the contact mass.

In Fig. 3 a separate reservoir or header casing 32 is provided, but in this instance it is on the exterior of apparatus casing 14b rather than on its interior as in the modification shown in Fig. 2. Casing 32 is in spaced relation to casing 14b but secured to the latter, and the thick layer of insulating material F which encloses casing 14b also encloses case 32. The inner conduits of distributing units D extend through the top of casing 14b, and are welded thereto as indicated. The extreme ends may be provided with flanged unions 33 by which connection is made with short conduits 34 extending from casing 32. The joints 33 are connected before insulating material F is applied to casings 14b and 32. Valved connections 35 and 36 are provided for feed and regenerating medium respectively opening directly into header 32, so that distribution of both is through the distributing units D as in the modification of the invention shown in Fig. 1.

The specific construction of the distributing members D is illustrated in Fig. 5. Outer conduit 37, which may be of thin tubing and has ports uniformly spaced throughout the length thereof, as previously described, surrounds inner conduit 38, so that an annular chamber is provided between the two conduits. The lower end of outer conduit 37 may be closed by a plate 39 welded thereto, and a similar plate 40 may close its upper end and secure it to inner conduit 38 as by welding.

Spacers in the form of series of blocks 41 radiating from inner conduit 38 may be provided to maintain conduits 38 and 37 in concentric relation. The ports in inner conduit 38 are not regularly spaced as in the outer conduit 37, but are quite irregular. There are no ports at all in the upper end of conduit 38, the first port being provided about one-third the way down. From this point the ports progressively increase in number and are thickly grouped together toward the outer end of conduit 38. With this arrangement fluid entering the inner conduit is heated by radiation from outer conduit 37 and cannot escape into the chamber between the two conduits until it is at least one-third the way down conduit 38, and until its temperature has been considerably raised. It then escapes in increasingly greater volume as the lower end is approached. Since the number and size of the ports is designed to maintain a substantially constant pressure throughout the chamber between the two conduits so as to effect an even discharge from all the ports in outer conduit 37, there is a reverse flow of fluid in the chamber between the conduits with the result that the fluid which escapes from the ports at the upper end of outer conduit 37 not only has received heat while within inner conduit 38, but has also picked up heat in its counter movement along the inner wall of outer conduit 37. Thus the fluid issuing through the ports in outer conduit 37 is at substantially the same temperature throughout the length of distributing unit D.

When the contact mass is in very small fragments, it may be advisable to make the ports in the outer conduit of the distributing unit in a slightly different form. For example, as indicated in Fig. 7, the outer conduit 37a of unit D' may be slotted throughout its length as by uniformly distributed saw-cuts 41'. These may be in groups if desired. In the preferred arrangement there are three sets of saw-cuts angularly disposed at substantially 120° apart, as indicated in Fig. 8. Another way to provide proper distribution but to simplify the construction of the outer tube is to bore large holes 42 in the outer conduit 37b of unit D'' as indicated in Figs. 9 and 12 and to force into each of such holes 42 a plug 43. This plug, as indicated on an enlarged scale in Fig. 10, may be dished or hollowed on one side to leave a peripheral flange 43a susceptible of a certain degree of compression. The body of plug 43 may be slotted with saw-cuts as indicated at 44, care being taken that these cuts shall not extend through flange 43a. As an alternative arrangement, small holes may be bored in the plug instead of the slots 44. The mounting of a plug 43 in a hole 42 in the conduit is indicated by the detail sectional view of Fig. 12.

The contact mass B may be of any suitable or desired type for effecting the required modification of the substance which is to undergo treatment; thus, for example, it may be merely a mass of inert porous material such as broken fragments of brick or fireclay, lumps of pumice stone, or moulded pieces of the inert carrier disclosed in United States Patent of Alfred Joseph, No. 1,818,403, issued August 11, 1931. On the other hand, the mass may comprise materials having catalytic activity such as fragments of metals, including iron, molybdenum, cobalt, manganese, copper, nickel, vanadium, etc., or mixtures of such metal fragments or oxides of one or more of such metals, especially when supported by a carrier of known type as, for example, that disclosed in the aforesaid United States Patent No. 1,818,403, or it may comprise other materials such as fuller's earth, hydrosilicate of alumina with or without admixture of metals or metallic oxides, as disclosed in my copending application, Serial No. 600,581, filed March 23, 1932. In any case, the contact mass should be in the form of fragments, lumps, or moulded pieces to permit the fluid admitted thereto to spread or percolate freely therethrough and to permit the mass to be regenerated in situ.

When the mass is to be used for liquid treatment, the fragments must be quite small if the desired reaction is to be obtained during a contact period of reasonable length, and with such fine material the distributing units such as D' or D'' must be disposed in close arrangement and the openings in the outer walls are preferably in the slot or saw-cut form disclosed in the modifications illustrated in Figs. 7 to 12, inclusive, to prevent the mass from entering the outer conduit.

I claim as my invention:

1. Apparatus for effecting chemical transformations, comprising a casing providing a chamber, a contact mass within said chamber, the latter having an inlet for the material to be treated and an outlet for the resulting product, means for admitting and distributing a fluid throughout said mass, and means for preventing transfer of heat from said mass to said fluid before the latter reaches said chamber.

2. Apparatus for effecting chemical transformations, comprising a casing providing a chamber, a contact mass within said chamber, the latter having an inlet for the material to be treated and an outlet for the resulting product, perforated conduits embedded in said mass to secure uniform distribution therethrough, means for supplying a fluid to said conduits, and insulating means interposed between said chamber and said means for preventing transfer of heat from said mass to said fluid before the latter reaches said chamber.

3. Apparatus for effecting chemical transformations, comprising a casing providing a chamber, a contact mass within said chamber, the latter having an inlet for the material to be treated and an outlet for the resulting product, distributing means embedded in said mass, a header for supplying a fluid to said means, and means additional to an air space for restricting heat transfer between said mass and said header.

4. Apparatus for effecting chemical transformations, comprising a casing providing a chamber, a contact mass within said chamber, the latter having an inlet for the material to be treated and an outlet for the resulting product, distributing means embedded in said mass, a header for supplying a fluid to said means, and heat insulating means interposed between said chamber and said header.

5. Apparatus for effecting chemical transformations, comprising a casing providing a chamber, a contact mass within said chamber, the latter having an inlet for the material to be treated and an outlet for the resulting product, distributing means embedded in said mass, and a reservoir for fluid insulated from said mass but connected to said means.

6. Apparatus for effecting chemical transformations, comprising a casing providing a chamber for a contact mass and a chamber serving as a reservoir or header, distributing members extending from said reservoir chamber into said contact chamber, and means insulating said reservoir chamber from said contact chamber.

7. Apparatus for effecting chemical transformations, comprising a casing providing a chamber, a contact mass in said chamber, means isolating and insulating a portion of said chamber to form a reservoir or header, and distributing conduits embedded in said mass and connected to said reservoir portion.

8. An apparatus unit for effecting chemical transformations, said unit having insulating means dividing its interior into two chambers, one of said chambers serving as a reservoir or header, a contact mass in said other chamber, and distributing members embedded in said mass and connected with said reservoir through said means.

9. An apparatus unit for effecting chemical transformations, said unit having a partition dividing its interior into two chambers, a contact mass in one of said chambers, distributing conduits secured to said partition and embedded in said mass for connecting said chambers, and a layer of heat insulating material on one side of said partition.

10. Apparatus for effecting chemical transformations, comprising a casing providing a chamber for a contact mass and a chamber serving as a reservoir or header, distributing members extending from said reservoir chamber into said contact chamber, means insulating said reservoir chamber from said contact chamber, and means for directing into said contact chamber through said reservoir chamber and said distributing members either the material to be transformed or the regenerating medium for the contact mass.

11. The combination with a contact mass adapted to effect chemical transformations and to be regenerated in situ, of conduits extending thereinto for effecting uniform distribution throughout the mass, means for directing into said conduits at will either a material to be transformed or a regenerating medium for said mass, and means preventing heat exchange between said mass and said material or medium before the latter enters said conduits.

12. Apparatus for effecting chemical transformations comprising a casing providing a chamber, a contact mass within said chamber, fluid distributing means embedded in said mass, means providing a reservoir for fluid, connections from said reservoir to said distributing means, and heat insulating means interposed between said mass and said reservoir and surrounding said connections.

13. Apparatus for effecting chemical transformations comprising a casing providing a chamber, a contact mass within said chamber, fluid distributing conduits embedded in said mass, means providing a reservoir for fluid, individual connections from said reservoir to said distributing conduits, and a layer of heat insulating material entirely enclosing said reservoir.

14. Apparatus for effecting chemical transformations comprising a casing providing a chamber, a contact mass within said chamber, fluid distributing means embedded in said mass, means providing a reservoir for fluid, connections from said reservoir to said distributing means, means for directing into said reservoir either a material to be transformed or a regenerating medium for said mass, and heat insulating means interposed between said mass and said reservoir and surrounding said connections.

15. Apparatus for effecting chemical transformations comprising a casing providing a chamber, a contact mass within said chamber, distributing means embedded in said mass, means providing a reservoir for fluid outside of said casing, connections from said reservoir to said distributing means extending through said casing, and heat insulating material enclosing both said casing and said reservoir and extending between the same and around said connections.

16. Apparatus for effecting chemical transformations comprising a casing providing a chamber, a contact mass within said chamber, distributing means embedded in said mass, means providing a separate chamber or reservoir for fluid within said casing, connections from said last named chamber to said means, and heat insulating means enclosing said last named chamber and surrounding at least a portion of each of said connections.

17. The combination with a contact mass of a distributing member embedded therein, comprising nested conduits having openings therethrough, the outer of said conduits only being in contact with said contact mass, the openings in the outer of said conduits being regularly spaced throughout its length and the openings in the inner of said conduits being predominately at the outlet end and decreasing therefrom towards the inlet end.

18. The combination with a contact mass of a series of distributing members embedded therein in symmetrical arrangement, each member comprising nested conduits having openings therethrough, the outer of said conduits only being in contact with said contact mass, the openings in the outer of said conduits being regularly spaced throughout its length and the openings in the inner of said conduits being predominately at the lower end and decreasing therefrom until they cease entirely at some distance from the upper end of said inner conduit.

19. The combination with a contact mass in finely divided form of a distributing member embedded therein, comprising nested conduits having openings therethrough, the outer of said conduits only being in contact with said contact mass, the openings in the inner of said conduits being predominately at one end and decreasing therefrom and ceasing entirely at some distance from the other end of the same, while the openings in the outer conduit comprise spaced saw cuts or slots to prevent said mass from entering the space between said conduits.

20. A distributing member adapted and intended to be embedded in a contact mass for exothermic and/or endothermic reactions, said member comprising a conduit having holes therein at spaced intervals, and apertured plugs secured in said holes.

21. A fluid conducting member adapted and intended to be embedded in a contact mass, said member comprising a conduit having holes therein at spaced intervals, and dished plugs mounted in said holes with a press fit, said plugs being apertured for the passage of fluid.

22. A fluid conducting member adapted and intended to be embedded in a contact mass, said member comprising a conduit having holes therein at spaced intervals, and apertured plugs secured in said holes, said plugs being dished or hollowed on one side to provide a peripheral flange and the apertures therein comprising sawcuts or slots extending through said plugs but not through said flange.

23. Apparatus for effecting chemical transformations, comprising a casing providing a chamber for a contact mass and a chamber serving as a reservoir or header, distributing members extending from said reservoir chamber into said contact chamber, each of said members comprising nested conduits having openings therethrough, the openings in the outer conduits extending the full length thereof but the openings in the inner conduits being predominately at one end and decreasing progressively toward the other end, and means insulating said reservoir chamber from said contact chamber.

24. Apparatus for effecting chemical transformations, comprising a casing providing a chamber for a contact mass and a chamber serving as a reservoir or header, distributing members extending from said reservoir chamber into said contact chamber, each of said members comprising nested conduits having openings therethrough, the openings in the outer conduits extending the full length thereof but the openings in the inner conduits being predominately at one end and decreasing progressively toward the other end, means insulating said reservoir chamber from said contact chamber, and means for directing into said reservoir chamber at will either a material to be transformed or a regenerating medium for said mass.

25. Apparatus for effecting chemical transformations comprising a casing providing a chamber for a contact mass and a chamber serving as a reservoir or header, distributing members extending from said reservoir chamber into said contact chamber, each of said members comprising nested conduits the outer of which have apertures uniformly arranged the length thereof, and means insulating said reservoir chamber from said contact chamber.

26. Apparatus for effecting chemical transformations comprising a casing providing a chamber for a contact mass and a chamber serving as a reservoir or header, distributing members comprising nested conduits extending from said reservoir chamber into said contact chamber, means insulating said reservoir chamber from said contact chamber, and means for directing into said reservoir chamber at will either material to be transformed or a regenerating medium for said mass.

27. Apparatus for effecting chemical reactions comprising a casing providing a chamber for a contact mass and a chamber serving as a reservoir or header, a layer of heat insulating material about the entire interior of said reservoir chamber, means for protecting said heat insulating layer from the fluids admitted to said reservoir chamber, and apertured fluid conduits extending from said reservoir chamber into said contact chamber.

28. Apparatus for effecting chemical reactions comprising a casing providing a chamber for a contact mass and a chamber serving as a reservoir or header, a layer of heat insulating material about the entire interior of said reservoir chamber, a protective lining covering said heat insulating layer, and a series of apertured fluid conduits opening into said reservoir chamber through said layer and said lining and extending into said contact chamber.

29. Apparatus for effecting chemical reactions comprising a casing providing a chamber for a contact mass and a chamber serving as a reservoir or header, a layer of heat insulating material about the entire interior of said reservoir chamber, a lining of sheet material over said heat insulating layer, and fluid conduits extending from said lining through said layer and into said contact chamber.

30. A fluid conducting member adapted to be embedded in a contact mass comprising an outer conduit having openings in the form of slots or saw cuts throughout its length and closed ends, and an inner conduit entering through one of the closed ends of said outer conduit and terminating adjacent the other end for admitting fluid to or discharging fluid from said member.

31. A distributing member for fluids adapted and intended to be embedded in a contact mass for effecting exothermic and/or endothermic reactions, said member comprising nested inner and outer conduits, said outer conduit having apertures throughout its length but having both ends closed, said inner conduit extending through one of the closed ends of said outer conduit and having a lower closed end adjacent the other closed end of said outer conduit, said inner conduit having apertures adjacent its lower closed end.

32. A distributing member for fluids adapted and intended to be embedded in a contact mass for effecting exothermic and/or endothermic reactions, said member comprising nested conduits having openings therethrough, the outer of said conduits having closed ends and its openings distributed the length thereof, the inner of said conduits extending through one of said closed ends and having a lower closed end adjacent the other of said closed ends of said outer conduit, the openings in said inner conduit being predominately adjacent said lower closed end thereof and decreasing therefrom and ceasing entirely at a predetermined distance therefrom.

EUGENE J. HOUDRY.